(12) United States Patent
Ramsauer et al.

(10) Patent No.: US 8,413,939 B2
(45) Date of Patent: Apr. 9, 2013

(54) FASTENING ELEMENT FOR A THREADED BOLT

(75) Inventors: Dieter Ramsauer, Schweim (DE); Armin Gorontzi, Herdecke (DE); Peter Hoeschler, Velbert (DE)

(73) Assignee: DIRAK Dieter Ramsauer Konstruktionselemente GmbH, Ennepetal (DE)

( * ) Notice: Subject to any disclaimer, the term of this patent is extended or adjusted under 35 U.S.C. 154(b) by 0 days.

(21) Appl. No.: 12/669,379

(22) PCT Filed: Jul. 2, 2008

(86) PCT No.: PCT/EP2008/005379
§ 371 (c)(1),
(2), (4) Date: Jan. 27, 2010

(87) PCT Pub. No.: WO2009/010187
PCT Pub. Date: Jan. 22, 2009

(65) Prior Publication Data
US 2010/0143066 A1    Jun. 10, 2010

(30) Foreign Application Priority Data

Jul. 18, 2007 (DE) .................. 20 2007 009 997 U
Oct. 5, 2007 (DE) .................. 20 2007 013 934 U

(51) Int. Cl.
*A47B 96/00*    (2006.01)

(52) U.S. Cl.
USPC .................. 248/226.11; 248/214; 411/437

(58) Field of Classification Search ............. 248/220.43, 248/224.8, 222.14, 200, 214, 215, 226.11, 248/227.1, 227.4, 228.6, 231.71; 411/437, 411/107, 970; 24/457, 289; 269/43, 45, 269/136, 246, 291, 37, 48.1, 49
See application file for complete search history.

(56) References Cited

U.S. PATENT DOCUMENTS

| | | | |
|---|---|---|---|
| 2,364,880 A * | 12/1944 | Tinnerman | 411/527 |
| 4,802,804 A * | 2/1989 | Hirohata | 411/433 |
| 5,039,266 A * | 8/1991 | Nagayoshi et al. | 411/433 |
| 5,400,992 A * | 3/1995 | Pohl | 248/231.81 |
| 5,951,223 A * | 9/1999 | Lindquist | 411/175 |
| 8,132,767 B2 * | 3/2012 | Oh et al. | 248/214 |

FOREIGN PATENT DOCUMENTS

| | | |
|---|---|---|
| DE | 830717 | 2/1952 |
| DE | 3007488 | 9/1981 |
| DE | 29822793 | 2/1999 |
| DE | 20 2005 015 135 | 2/2007 |
| EP | 0035175 | 9/1981 |
| EP | 1655418 | 5/2006 |
| EP | 1683937 | 7/2006 |
| WO | WO 2006/123844 | 11/2006 |
| WO | WO 2007/033714 | 3/2007 |

* cited by examiner

*Primary Examiner* — Alfred J Wujciak
(74) *Attorney, Agent, or Firm* — Frommer Lawrence & Haug LLP

(57) ABSTRACT

The description concerns a fastening element for a bolt provided with a thread, in particular a stud bolt, comprising a block which is made of plastic, provided with a threaded bore hole and can be screwed onto the bolt. The fastening element is characterized in that the threaded bore hole is open laterally by means of an axial slot in such a way that the block can also be fitted on the threaded bolt laterally.

19 Claims, 10 Drawing Sheets

34
232
38

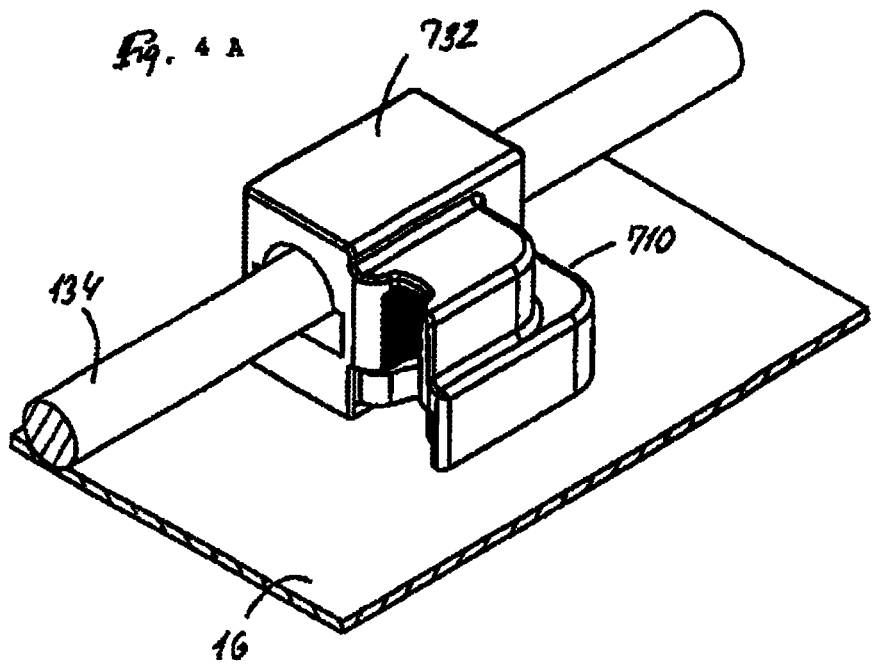
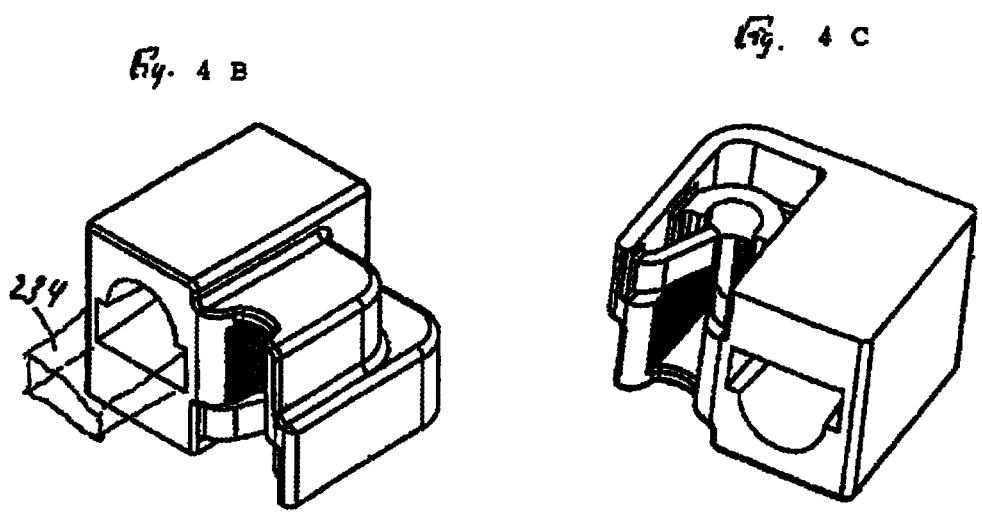

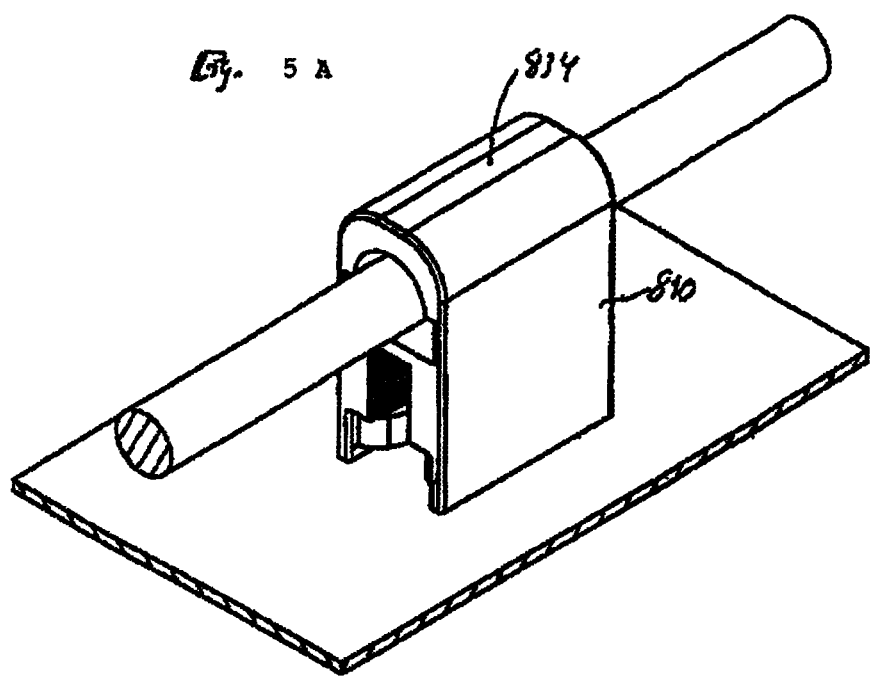
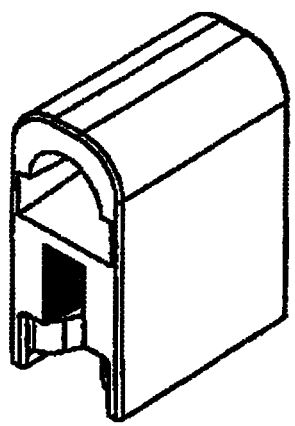
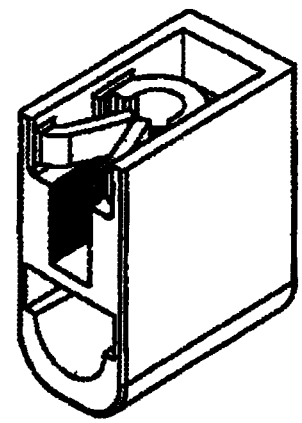

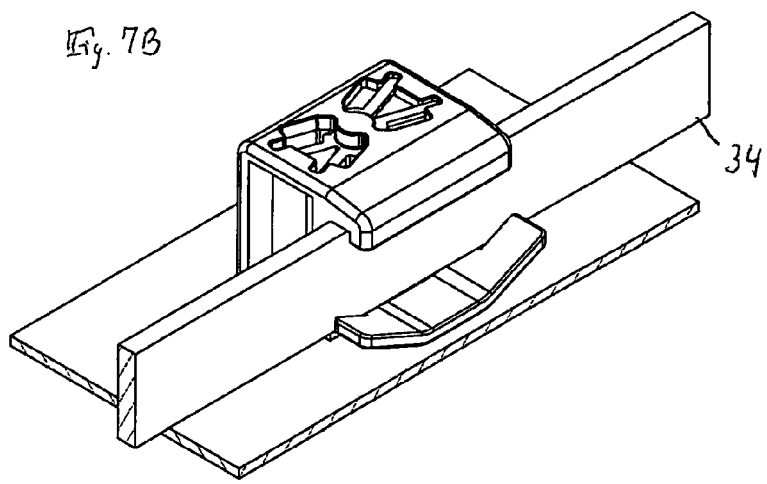
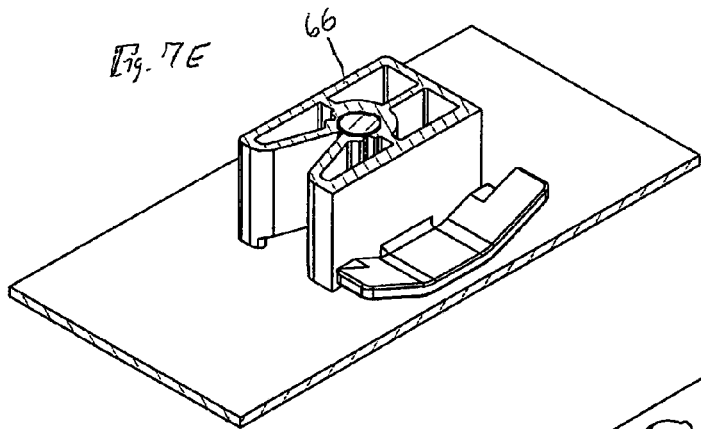
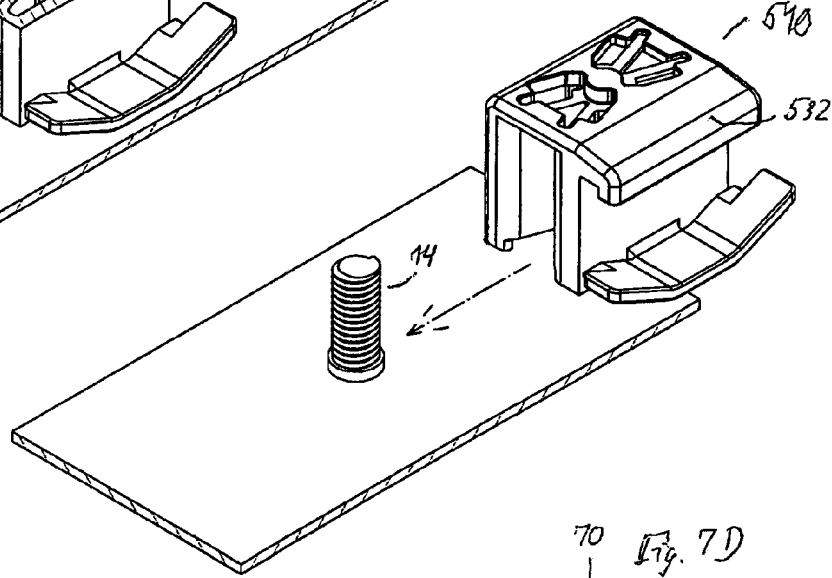
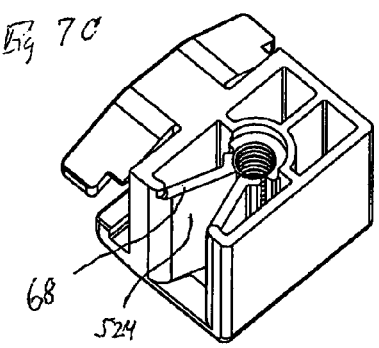
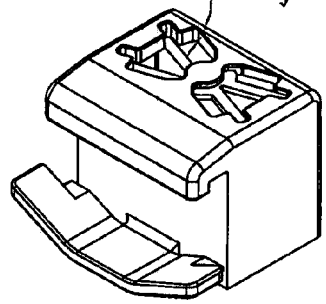

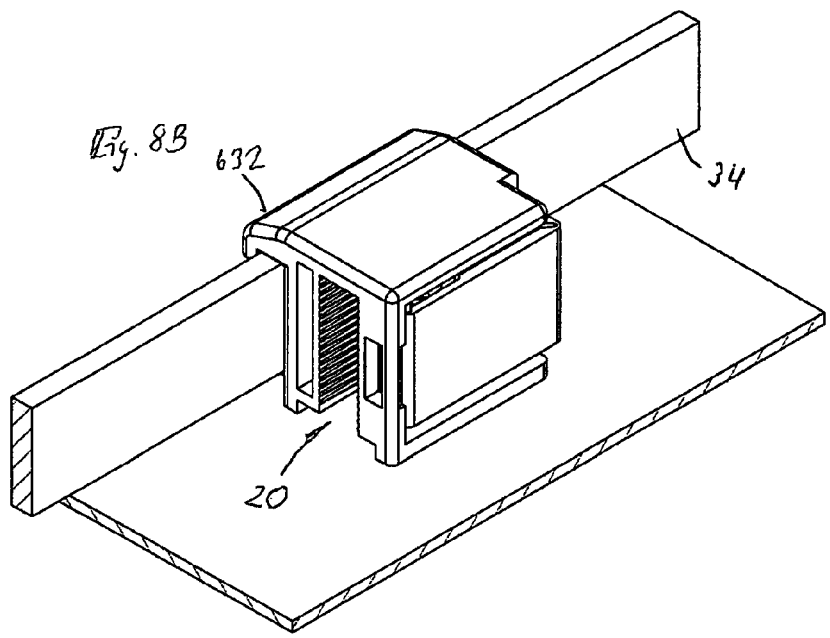
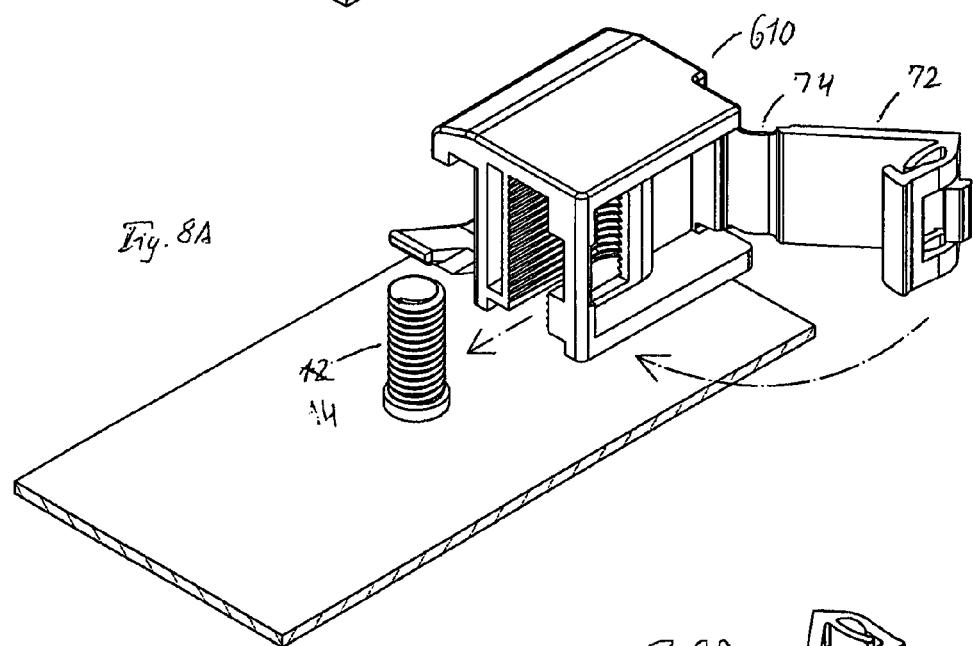
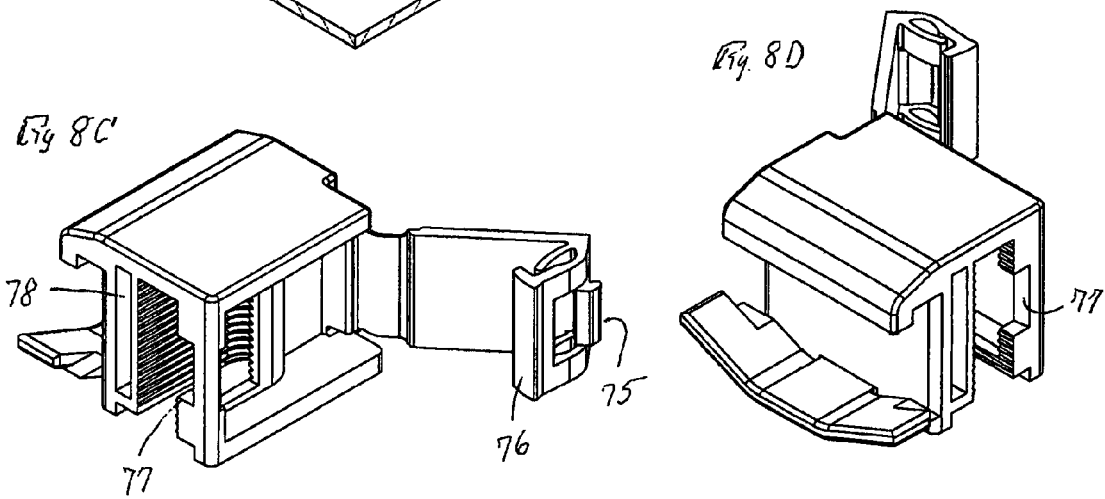

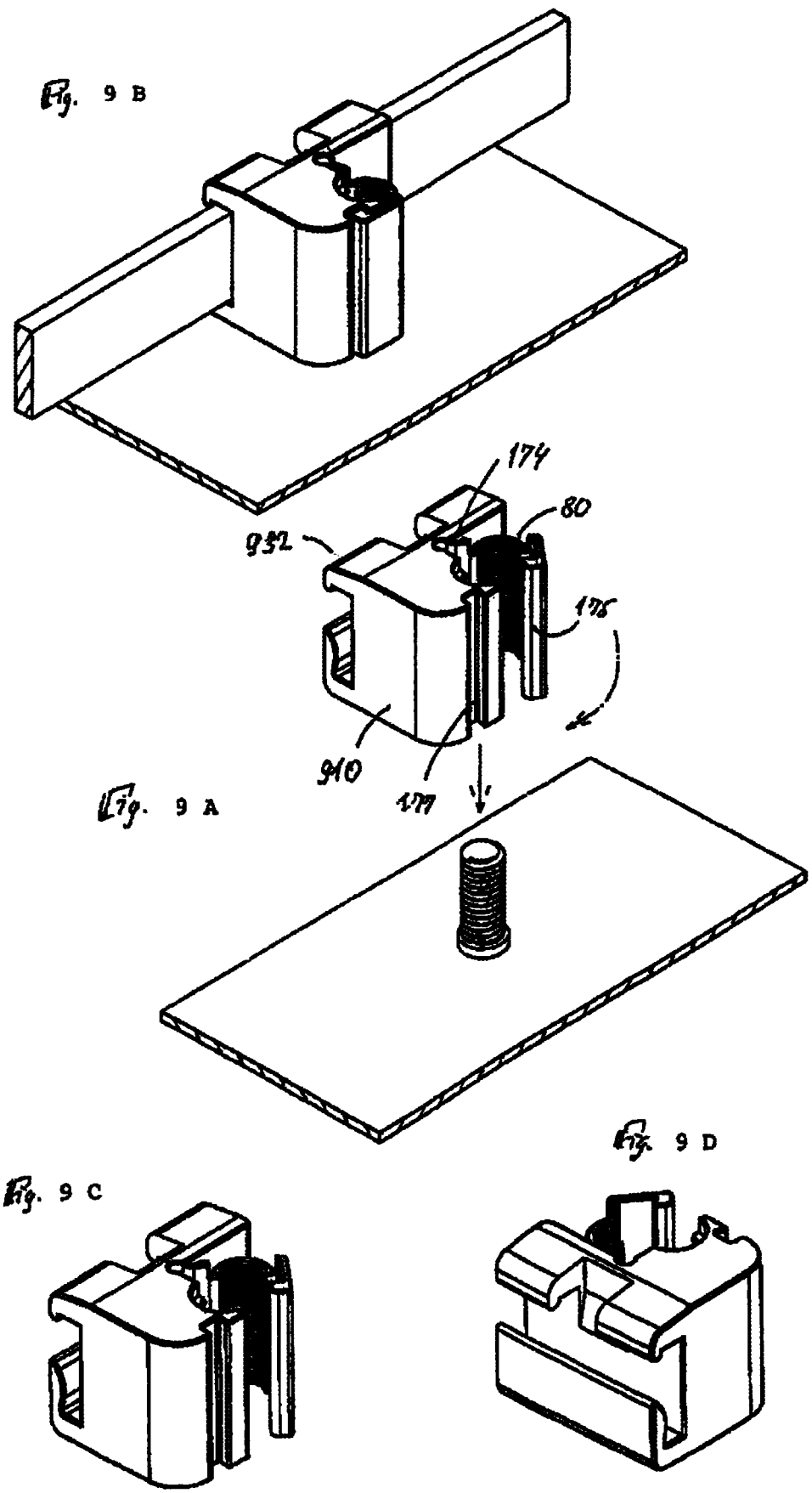

FASTENING ELEMENT FOR A THREADED BOLT

The present application claims priority from PCT Patent Application No. PCT/EP2008/005379 filed on Jul. 2, 2008, which claims priority from German Patent Application No. 20 2007 009 997.5 filed on Jul. 18, 2007, and German Patent Application No. 20 2007 013 934.9 filed on Oct. 5, 2007, the disclosure of which is incorporated herein by reference in its entirety.

BACKGROUND OF THE INVENTION

1. Field of the Invention

The invention is directed to a fastening element for a bolt provided with a thread, in particular a stud bolt, comprising a block which is made of plastic and which is provided with a threaded bore hole and can be screwed onto the bolt.

2. Description of Related Art

A fastening element in the form of a bar guide of the type mentioned above is already known from DE 30 07 488 as is shown, for example, in FIG. 2 of that reference.

SUMMARY OF THE INVENTION

There are applications in which it is too time-consuming to screw on the fastening element. It is the object of the invention to provide a fastening element for a threaded bolt which can be mounted faster, particularly in that an accurate mounting is carried out without lengthy screwing or with only a few rotating movements.

The above-stated object is met in that the threaded bore hole is open laterally by means of an axial slot in such a way that the block can also be fitted on the threaded bolt laterally.

Accordingly, a large number of revolutions need not be carried out in order for the block to reach its working position. At the same time, a precise adjustment of the block with respect to the supporting surface from which the bolt, particularly the stud bolt, emerges can be carried out by few turns.

According to a further development of the invention, the lateral opening is constructed in such a way that the block locks on the bolt after being fitted laterally in the threaded bore hole. This better ensures that the block will remain on the bolt even when the block is loaded, for example, by a connecting bar guided by it.

It is also advantageous when the opposite surfaces of the slot continue the threaded grooves of the bore hole. This facilitates the insertion and exact positioning of the block on the threaded bolt.

The locking device can be formed by a narrowing of the lateral opening, which is possible because the block is made chiefly of plastic.

This plastic is sufficiently pliant to achieve a locking effect.

This locking device can also be formed by noses which are arranged separately at an upper end and/or lower end of the threaded bore hole. This also applies in particular when the block is formed of a less pliant material such as metal, for example.

The threaded bore hole can also be a blind bore hole, and the open end can have a threadless, back-springing area. Spring legs can spring inward from the latter, and the spring legs can back off behind the threads of the threaded bore hole when the end of a bolt is inserted laterally and spring back when the end position of the insertion path of the end of the bolt in the threaded bore hole is reached in such a way that the bolt is secured in the end position.

On the other hand, the threaded bore hole can also be a through-bore hole.

The block can have a foot-like enlargement at the bottom end which forms a U-shaped supporting surface for supporting the block on a wall around the stud bolt with recesses for receiving any weld residues or rivet projections.

The block can be part of a fitting or other functional element to be fastened to the wall surface.

The block can carry or form a fitting or other functional element at one side.

The block can have self-locking spring devices as locking means.

Accordingly, it is possible for the block to be formed of thin walls and intermediate walls in order to economize on material.

For example, a particularly effective fastening element is a bar guide for a ribbon bar of a bar lock, or the like, which is provided particularly for mounting in the bending area of sheet metal cabinet doors, this ribbon bar being guided upright with respect to the fastening plane and carrying locking means which cannot be disassembled or which can only be disassembled with difficulty. The bar guide comprises a block having the bore hole for a fastening bolt extending perpendicular to the fastening plane, and a projection for engaging the two narrow edges of the ribbon bar is arranged parallel to the fastening plane at one side of the block at the upper edge remote of the fastening plane and at the lower edge close to the fastening plane. The projection arranged at the lower edge can have two springing wings which extend diagonally upward in direction of the longitudinal axis of the bar and which have notches which engage the narrow edge of the ribbon bar.

The notch is advantageously arranged at the inner end of the wing facing the block.

The inner side of the notch can be formed by the block wall (front side of the block) from which the projections emerge.

The block can be made of flexible material such as plastic, and the wings with the projection can be injection molded integral with the block.

However, the projection with the wings can also have a support made of spring metal such as spring steel which increases the springing force and wear resistance.

Finally, the projection with the wings can be made of spring metal such as spring steel and can be anchored in the block.

In another embodiment form, the lateral slot can be closed in such a way by a plastic strip which is articulated at the fastening element by a film hinge that the bolt is held in the threaded bore hole by the strip (FIGS. 8A-8D).

The fitting can also be a bar guide for a round bar and/or for a ribbon bar of a bar lock, which ribbon bar is guided horizontally with respect to the fastening plane, these bars being insertable axially through the bar guide, wherein the bar extends lateral to the threaded bore hole (FIGS. 9A to 9C) or above the threaded bore hole (FIGS. 5A to 5C).

According to another embodiment form, the lateral slot is formed by a threaded portion which is designed such that it can be folded away by means of film hinges (FIGS. 9A to 9D).

According to another embodiment form, the fastening element is provided with a bore hole instead of the threaded bore hole and, instead of the lateral axial slot, is provided with flexible tongues which spring forward from the bore hole wall and which engage in the thread turns of the bolt and are oriented in such a way that the block can be pushed onto the bolt axially but cannot be pulled off again.

In a construction of the type mentioned above, the block can be made of plastic and the tongues can be injection molded with the block (FIGS. 10A to 10E).

BRIEF DESCRIPTION OF THE DRAWINGS

FIGS. 4A to 4C show three views of an embodiment form of a bar guide for sliding bearing support of round bars or ribbon bars oriented parallel to the fastening surface alongside the bolt;

FIGS. 5A to 5C show three views of an embodiment form of a bar guide for sliding bearing support of round bars or ribbon bars oriented parallel to the fastening surface above the bolt;

FIGS. 7A to 7E show analogous views of an embodiment form of a ribbon bar guide for insertion from the side, wherein FIG. 7E shows a cropped view;

FIGS. 8A to 8D show views analogous to those in FIGS. 7A to 7D showing another embodiment form of a ribbon bar guide with a flap-like closing device;

FIGS. 9A to 9D show views similar to FIGS. 8A to 8D showing another embodiment form of a ribbon bar guide which can be fitted onto the bolt axially and which has a threaded bore hole portion which can be folded away by means of a film hinge;

FIGS. 10A to 10E show views similar to FIGS. 9A to 9D showing a ribbon bar guide which can be fitted onto the bolt axially and which has plastic tongues, wherein FIG. 10E shows an enlarged section from FIG. 10A.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1B:
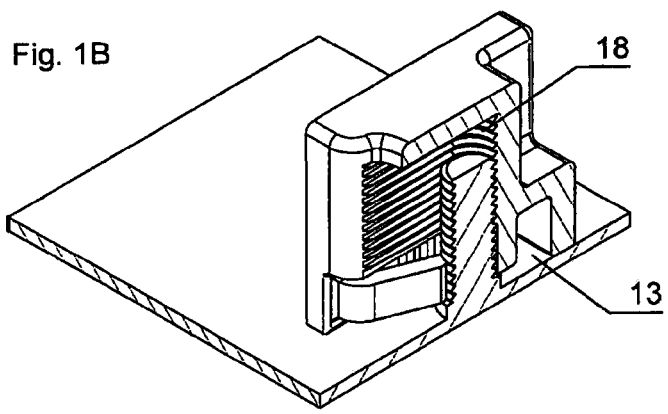
FIG. 1B shows a sectional view of the fastening device in the mounted position.
Figure 1A:
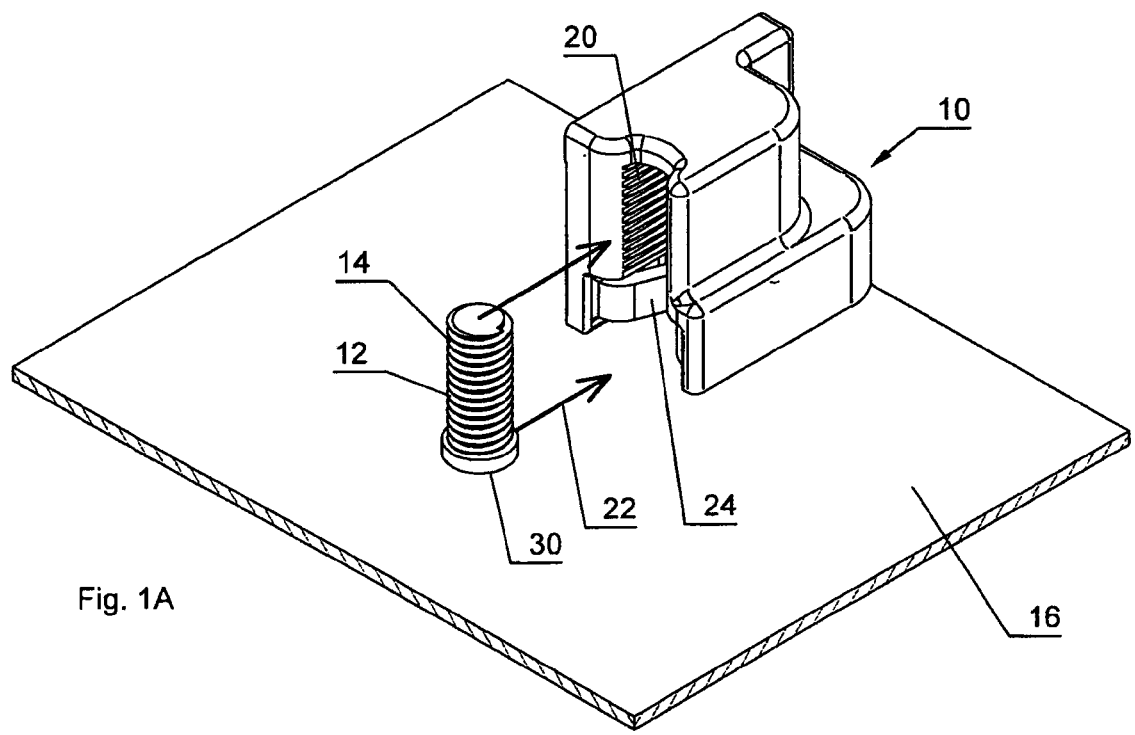
FIG. 1A shows a perspective top view of a wall with a thread with a stud bolt on which a fastening device according to the invention can be fitted laterally.

FIG. 1A shows a perspective view of a fastening element 10 for cooperating with a bolt 14 provided with a thread 12, shown here in the form of a stud bolt 14 which is welded or riveted to a metal sheet 16. The fastening element comprises a threaded bore hole 18, is made of plastic and has an axial slot 20 which is open laterally in such a way that the block can also be fitted to the threaded bolt 12 laterally and the bolt can be inserted into the slot, which movements are indicated by arrows 22. As can be seen in FIGS. 1A and 1B, the threaded bore hole 18 is a blind bore hole, whereas a through-hole, designated by reference number 118, is provided in the embodiment form according to FIGS. 2A to 2D.

To prevent the bolt from exiting the lateral opening, the lateral opening is formed in such a way that the block 10 or 110 locks on the bolt after being pushed onto it laterally. For this purpose, the block can be constructed in such a way that the opposite surfaces of the slot 20 form a narrowed portion. The opposite surfaces of the slot are advantageously provided with threaded grooves which continue the threaded grooves of the bore hole so that the bolt can be inserted without difficulty.

Alternatively or in addition, the locking device can be formed by noses 24 which are arranged at the upper and/or lower end of the threaded bore hole. According to FIG. 1A, the threaded bore hole 18 is a blind bore hole and the open end has a threadless back-springing area 26 from which spring legs 24 spring inward as can clearly be seen from FIG. 1C. These spring legs 24 move back behind the threads of the threaded bore hole 18 when a bolt end 12 is inserted laterally and spring back in such a way when the end position of the insertion path of the bolt end in the threaded bore hole is reached that the bolt is held in the end position.

The block can have a foot-like enlargement 28 at the lower end which forms a U-shaped supporting surface for supporting the block on a wall 18 around the stud bolt 14 with recesses 13 for receiving possible weld residues or rivet projections 30.

Figures 1C, 1D:
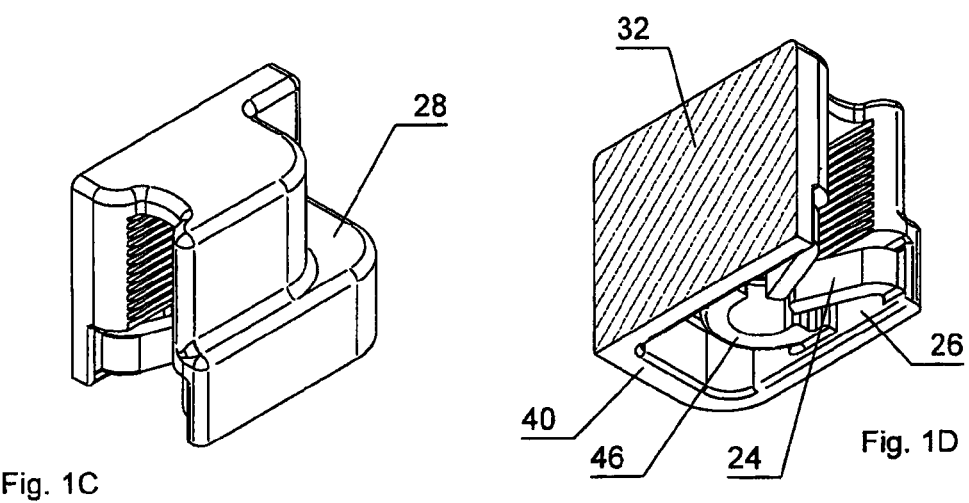
FIGS. 1C and 1D show two perspective views of the fastening element from FIGS. 1A and 1B.
Figure 2B:
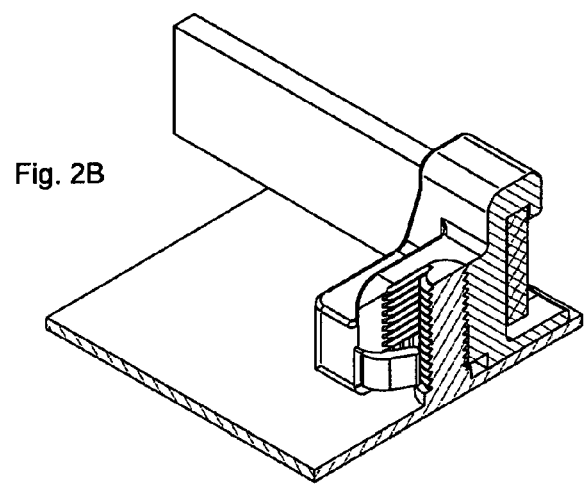
FIGS. 2A to 2D show views similar to FIGS. 1A to 1D showing an embodiment form in which the fastening element holds a bar guide in which the bar can be inserted laterally.
Figure 2A:
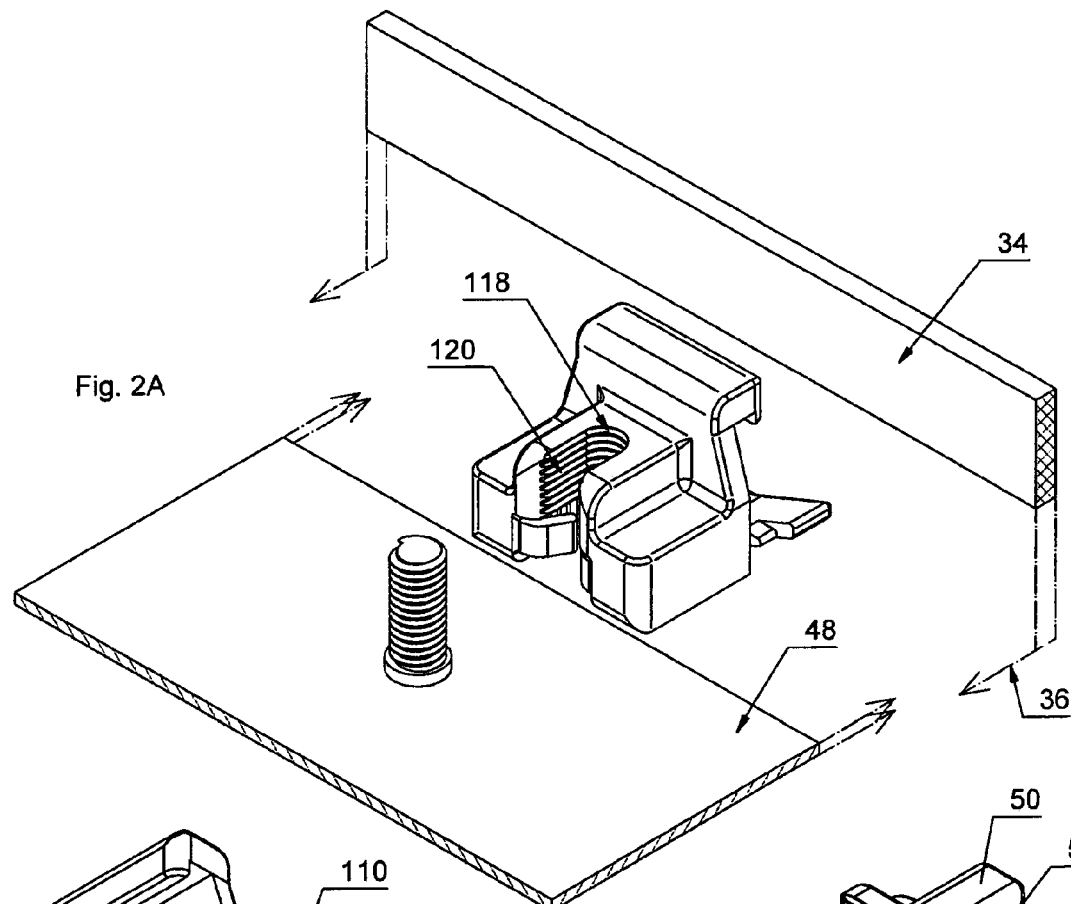
Figure 2D:
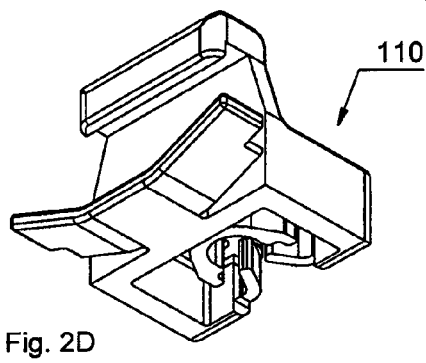
Figure 2C:
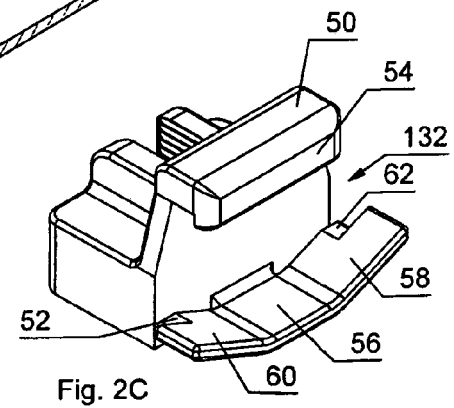

The block 10 can be part of a fitting or other functional element to be fastened to the wall surface 16. FIG. 1D shows only surface 32 on which a fitting or functional element of this kind is located.

Figure 3B:
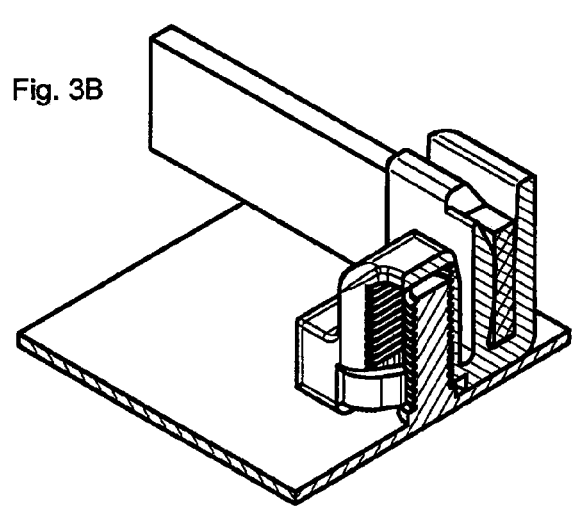
FIGS. 3A to 3D show views similar to FIGS. 2A to 2D showing a bar guide which is arranged at the fastening element and in which the bar can be inserted from the top.
Figure 3A:
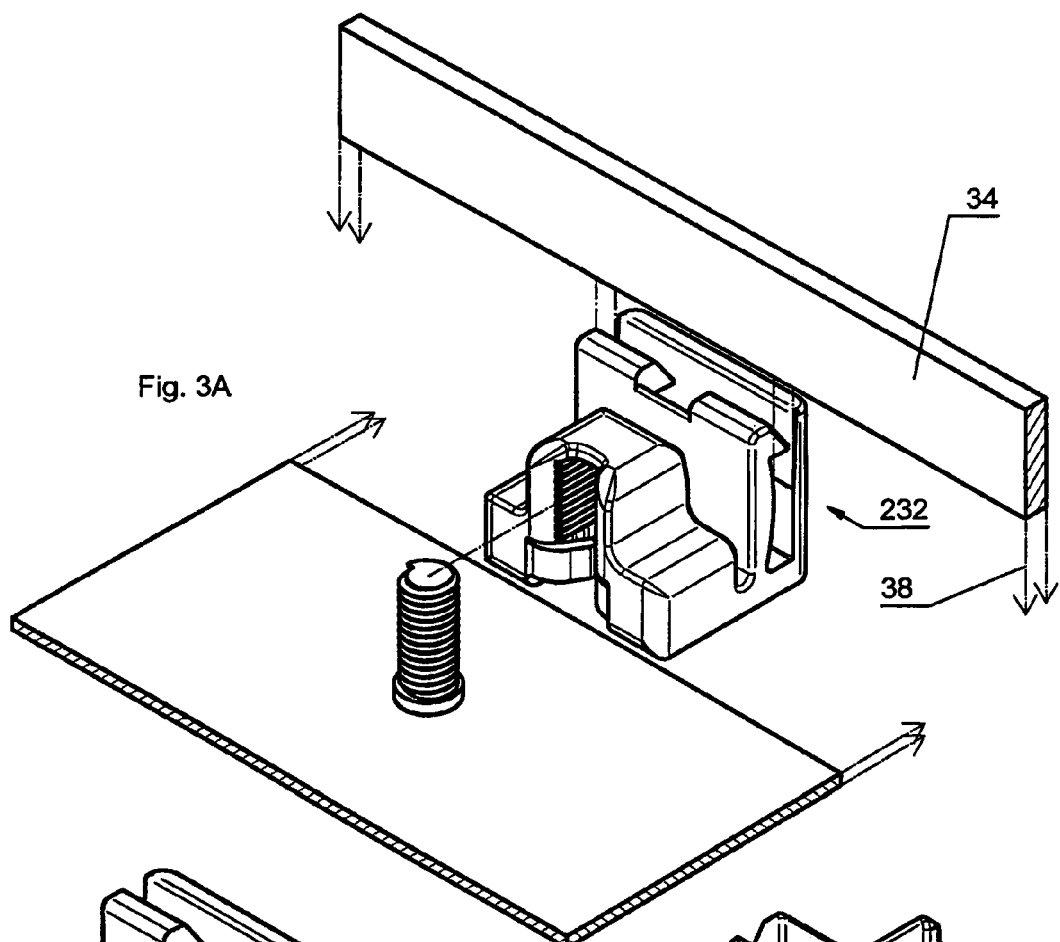
Figure 3C:
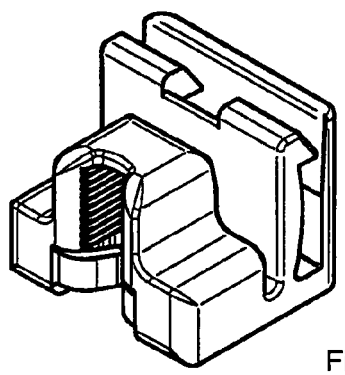
Figure 3D:
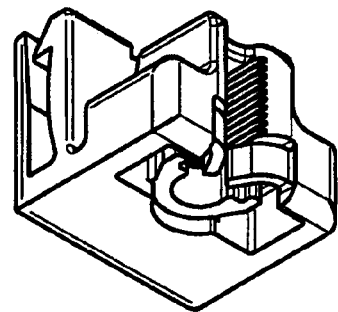
Figure 6B:
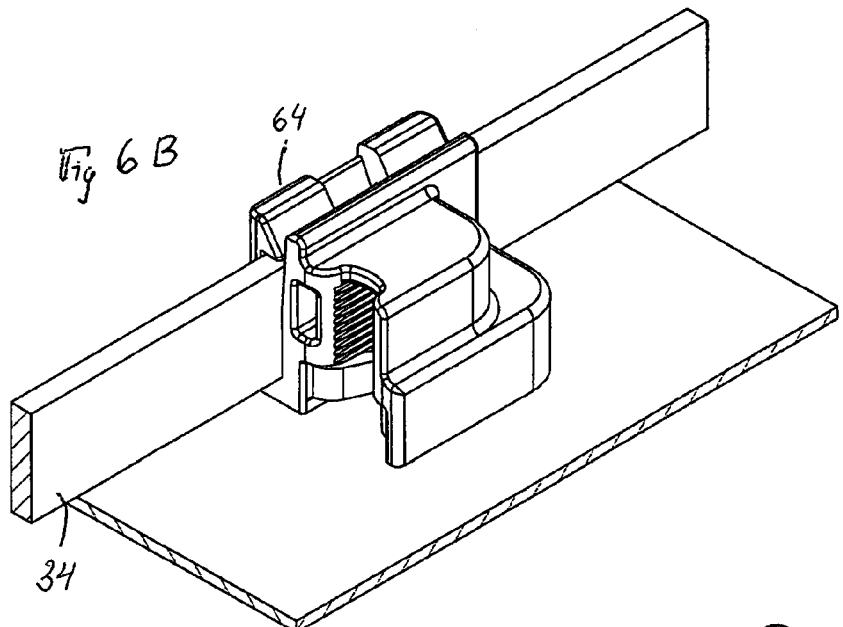
FIGS. 6A to 6D show an analogous view of the fastening element according to FIGS. 1A to 1D in the form of a ribbon bar guide for guiding in an upright manner and insertion from above.
Figure 6A:
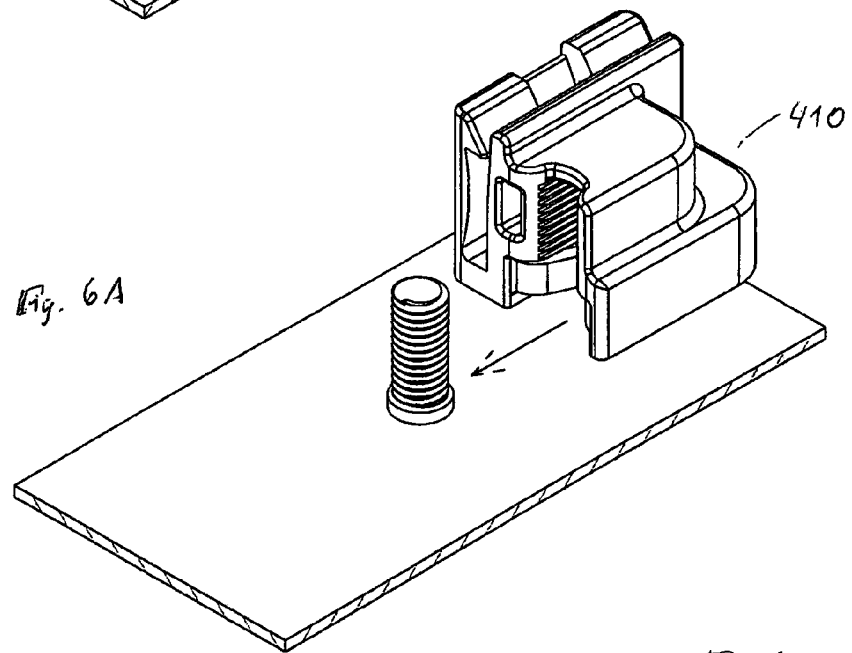
Figure 6C:
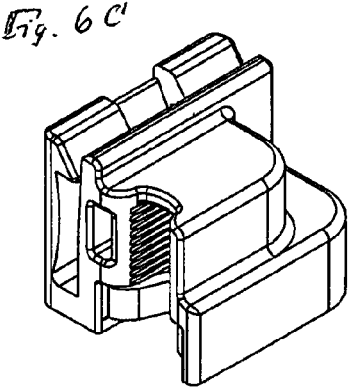
Figure 6D:
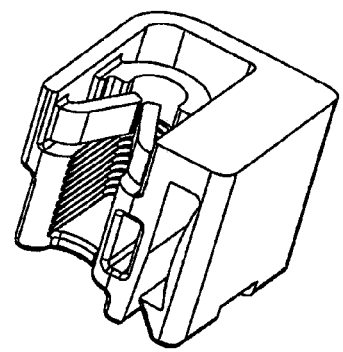

In FIGS. 2A to 2D, a bar guide 132 is provided instead of this wall surface 32. A ribbon bar 34 can be inserted laterally into this bar guide 132 (see arrow 36). However, in the embodiment form according to FIGS. 3A to 3D, the ribbon bar 34 can be inserted from above (see arrow 38 in FIG. 3A).

In the embodiment form according to FIGS. 4 and 5, the block 310 functions as a screw nut with a hexagonal circumference in this case. After being fitted onto a bolt with a corresponding thread (see arrow 40), the nut 310 can be turned (see arrow 42) to displace the nut along the bolt 312 (see arrow 44).

The noses or spring legs 24, 124, 224, 324 are self-locking spring devices which serve as locking means.

The block can be formed of thin walls and intermediate walls to economize on material (see FIG. 1D with walls 40, 46).

For example, a particularly effective fastening element according to FIGS. 2A to 2D is a bar guide for a ribbon bar 34 of a bar lock, or the like, which is provided particularly for mounting in the bending area of sheet metal cabinet doors, this ribbon bar being guided upright with respect to the fastening plane and carrying locking means which cannot be disassembled or which can only be disassembled with difficulty. The bar guide comprises a block 110 having the bore hole 118 for a fastening bolt 114 extending perpendicular to the fastening plane 48, and a projection 54, 56 for engaging the two narrow edges of the ribbon bar 34 is arranged parallel to the fastening plane 48 at one side of the block 110 at the upper edge 50 remote of the fastening plane 48 and at the lower edge 52 close to the fastening plane. The projection 56 arranged at the lower edge can have two springing wings 58, 60 which extend diagonally upward in direction of the longitudinal axis of the bar and which have notches 62 which engage the narrow edge of the ribbon bar.

The notch 62 is advantageously arranged at the inner end of the wing 58, 60 facing the block 110.

The inner side of the notch 62 can be formed by the block wall (front side of the block 110) from which the projections 56, 58, 60 emerge.

The block can be made of flexible material such as plastic, and the wings 58, 60 with the projection 56 can be injection molded integral with the block 110.

However, the block can also be made of a non-flexible material (e.g., metal) which has the advantage of greater strength.

However, the projection with the wings can also have a support made of spring metal such as spring steel, not shown, which increases the springing force and wear resistance.

Finally, the projection with the wings can be made of spring metal such as spring steel and can be anchored in the block, not shown.

FIGS. 6A to 6D show analogous views of the fastening element 10 according to FIGS. 1A to 1D in the form of a ribbon bar guide 410 for guiding the bar 34 in an upright manner. The bar 34 can be inserted from above into the guide formed by two hooks 64 which can be pushed away to the sides.

FIGS. 7A to 7D again show analogous views of an embodiment form of a ribbon bar guide 532 similar to those shown in FIGS. 2A to 2D for inserting the ribbon bar 34 from the side. FIG. 7E is a cropped view showing the clamping construction of the block profile 66. The spring legs 524 are free at both ends, the recess 68 and the opening 70, to preserve their flexibility.

When the block, in the form of a bar guide 510 in the present instance, is pushed onto the threaded bolt 14, the spring legs 524 spring outward so as to spring back into the locking supporting position which is shown in FIG. 7E when the bolt 14 has reached its end position in the block 510. Unlocking is possible only by means of a tool (e.g., by means of a screw driver whose blade can be inserted sufficiently through the suitable opening 70, to spread the spring legs 524 apart and make it possible to remove the block 510 from the bolt 14). Further, the opening 70 makes it possible to visually monitor the locking state.

In views similar to FIGS. 7A to 7D, FIGS. 8A to 8D show another embodiment form of a ribbon bar guide 632 with a flap-shaped closing device 72 which is articulated at the fastening element 610 by means of film hinge 74 and can be locked in the folded in position (FIG. 8B) by means of a locking bracket 75 which can be received by a recess 77 in the block 610. In so doing, the surface 76 presses against the bolt 14.

In the state shown in FIG. 8B (i.e., with the flap 72 closed), and also in the state shown in FIG. 8A (i.e., with the flap 72 open), the block 610 can be placed on the bolt 14 laterally. However, removal is possible only when the flap 72 is open.

FIGS. 4A to 4C show three views of an embodiment form of a bar guide 732 for axial sliding bearing support of round bars 134 or ribbon bars 234 oriented parallel to the fastening surface 16 alongside the bolt. FIGS. 8A to 8C show three views of an embodiment form of a bar guide 832 for sliding bearing support of round bars or ribbon bars oriented parallel to the fastening surface above the bolt.

FIGS. 9A to 9D show views similar to FIGS. 8A to 8D of another embodiment form of a ribbon bar guide 932 which can be fitted axially on the bolt and which has a threaded bore hole portion 80 which can be folded away by means of film hinge 174 and which can be locked by a locking bracket 175 which can be received by a groove 177 in the block 910.

Figure 10:
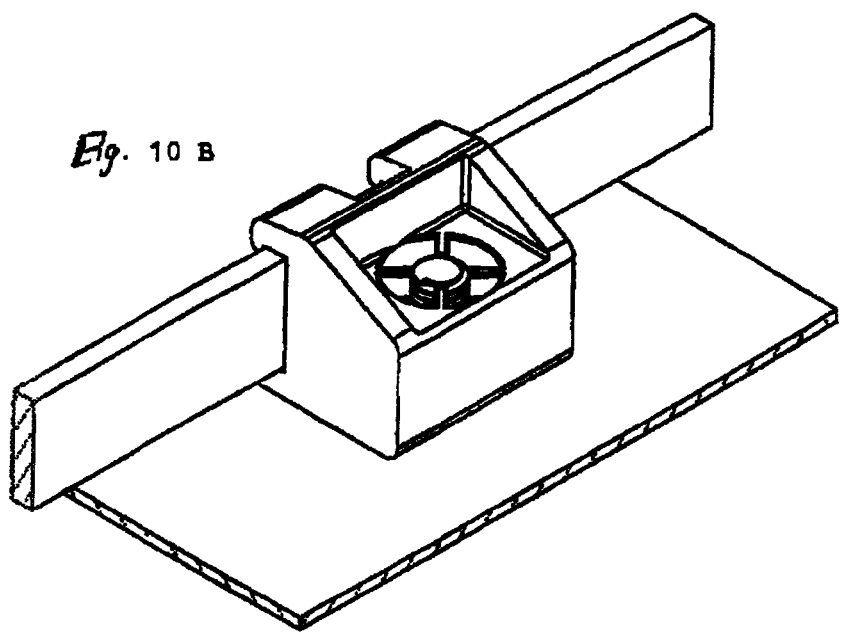
Figure 10:
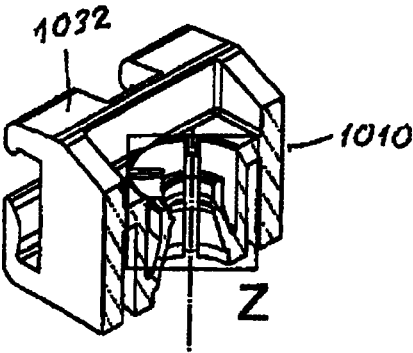
Figure 10:
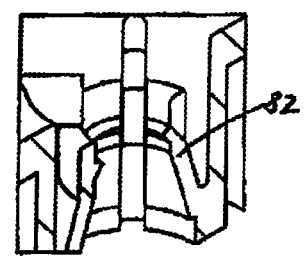
Figure 10:
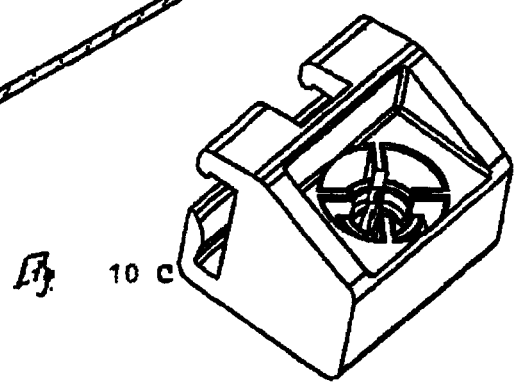
Figure 10:
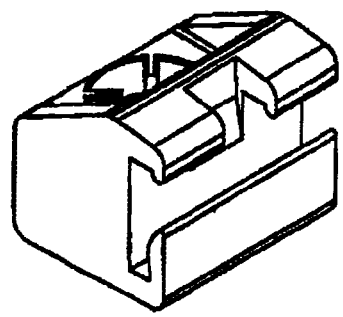

FIGS. 10A to 10D show views similar to FIGS. 9A to 9D of a ribbon bar guide 1032 which can only be fitted to the bolt 14 axially and which has plastic tongues 82, wherein FIG. 10E shows an enlarged section from FIG. 10A.

The springing area in plastic is designed by reference number 82. This block can be removed only by unscrewing the block from the thread of the bolt 14.

Industrial Applicability

The invention is industrially applicable in switch cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 10, 110, 210, 410, 510,
610, 710, 810, 910, 1010 fastening element, block
12 thread, end of bolt
13 recesses
14 bolt
16 sheet metal wall
18, 118 threaded bore hole. blind bore hole, through-bore hole
20 axial slot, lateral opening
22 arrow
24 nose, spring leg
26 threadless area
28 foot-like enlargement
30 rivet projection, weld residues
32, 132, 232, 532, 632,
732, 832, 932, 1032 surface for fitting or functional element, bar guide
34, 143, 234 ribbon bar, round bar
36 arrow
38 arrow
40 wall, arrow
46 wall
48 fastening plane
50 upper edge
52 lower edge
54 projection
56 projection
58 wing
60 wing
62 notches
64 hook
66 block profile
68 recess
70 opening
72 flap-shaped lock device
74 film hinge
76 surface
78 slot
80 threaded bore hole portion
82 plastic tongues

The invention claimed is:

1. A bar guide for a ribbon bar of a bar lock, the bar guide being provided for guiding the bar upright with respect to a fastening plane, the bar guide comprising:

a block having a threaded bore hole that can be screwed onto a stud bolt, whereby the threaded bore hole is opened laterally by an axial slot in such a way that the block can also be fitted laterally onto the stud bolt; and projections arranged for extending parallel to the fastening plane, one projection of the projections extending from one side of the block at the upper edge remote from the fastening plane and another projection of the projections extending from the lower edge close to the fastening plane for engaging the ribbon bar;

wherein the projection arranged at the lower edge has two springing wings which extend diagonally upward in direction of the longitudinal axis of the ribbon bar, each of the springing wings having a notch which engages a narrow edge of the ribbon bar.

2. The bar guide according to claim 1;
wherein the lateral opening is constructed in such a way that the block locks on the bolt after being fitted laterally in the threaded bore hole.

3. The bar guide according to claim 2;
wherein the locking device is formed by a narrowing of the lateral slot.

4. The bar guide according to claim 2;
wherein the locking device is formed by noses which are arranged at an upper end and/or lower end of the threaded bore hole.

5. The bar guide according to claim 1;
wherein the opposite surfaces of the slot continue the threaded grooves of the bore hole.

6. The bar guide according to claim 1;
wherein the threaded bore hole is a blind bore hole, and the open end has a threadless, back-springing area from which spring legs can spring inward; and
wherein the spring legs back off behind the threads of the threaded bore hole when the end of a bolt is inserted laterally and spring back when the end position of the insertion path of the end of the bolt in the threaded bore hole is reached in such a way that the bolt is secured in the end position.

7. The bar guide according to claim 1;
wherein the threaded bore hole is a through-bore hole.

8. The bar guide according to claim 1;
wherein the block has a foot-like enlargement at the bottom end which forms a U-shaped supporting surface for supporting the block on a wall around the stud bolt with recesses for receiving any weld residues or rivet projections.

9. The bar guide according to claim 1;
wherein the block has self-locking spring devices as locking means.

10. The bar guide according to claim 1;
wherein the block is formed of thin walls and intermediate walls in order to economize on material.

11. The bar guide according to claim 1;
wherein each notch is arranged at the inner end of its respective wing facing the block.

12. The bar guide according to claim 1;
wherein the inner side of each notch is formed by the block wall from which the projection emerges.

13. The bar guide according to claim 1;
wherein the block is made of flexible material such as plastic; and
wherein the wings of the projection are injection molded integral with the block.

14. The bar guide according to claim 13;
wherein the projection has a support made of spring metal which increases the springing force and wear resistance.

15. The bar guide according to claim 13;
wherein the projection with the wings is made of spring metal and is anchored in the block.

16. The bar guide according to claim 1;
wherein the block is made of a non-flexible material such as metal.

17. The bar guide according to claim 1;
wherein the lateral slot can be closed by a plastic strip, the plastic strip being articulated at the fastening element by a film hinge; and
wherein, when the lateral slot is closed by the plastic strip, the bolt is held in the threaded bore hole by the strip.

18. The bar guide according to claim 1;
wherein the bar guide is provided for a round bar and/or for a ribbon bar of a bar lock;
wherein, when the fitting is a bar guide for a ribbon bar, the ribbon bar is guided horizontally with respect to the fastening plane;
wherein the round bar and/or ribbon bar is insertable axially through the bar guide; and
wherein the round bar and/or ribbon bar extends lateral to the threaded bore hole or above the threaded bore hole.

19. The bar guide according to claim 1;
wherein the lateral slot is formed by a threaded part which is designed such that it can be folded away by means of film hinge.

* * * * *